No. 755,569. Patented March 22, 1904.

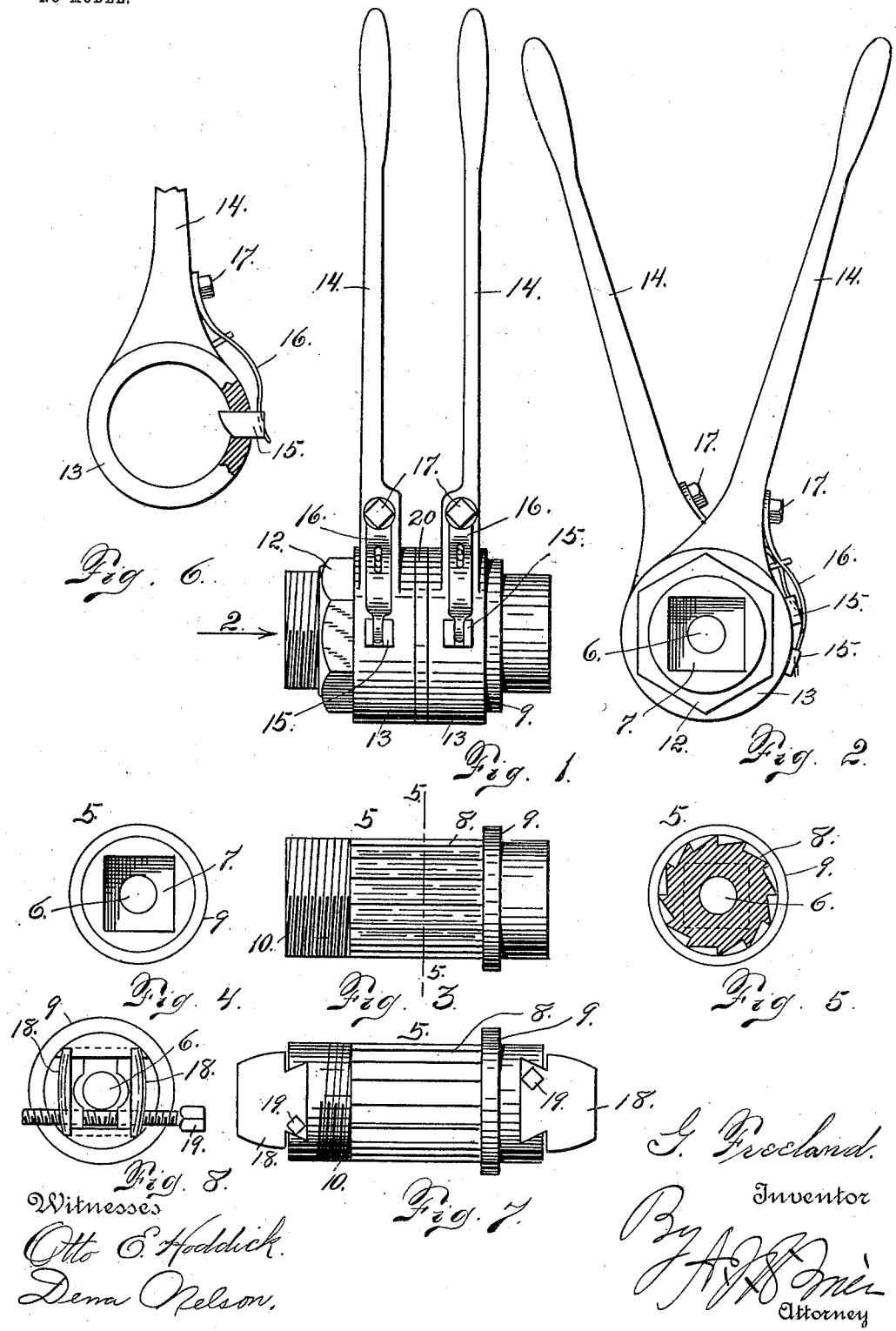

UNITED STATES PATENT OFFICE.

GUS FREELAND, OF DENVER, COLORADO.

RATCHET-WRENCH.

SPECIFICATION forming part of Letters Patent No. 755,569, dated March 22, 1904.

Application filed August 10, 1903. Serial No. 168,862. (No model.)

*To all whom it may concern:*

Be it known that I, GUS FREELAND, a citizen of the United States of America, residing in the city and county of Denver and State of Colorado, have invented certain new and useful Improvements in Ratchet-Wrenches; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in ratchet-wrenches, my object being to provide a device of this class which shall be simple in construction, economical in cost, reliable, durable, and efficient in use; and to these ends the invention consists of the features, arrangements, and combinations hereinafter described and claimed, all of which will be fully understood by reference to the accompanying drawings, in which is illustrated an embodiment thereof.

In the drawings, Figure 1 is a front elevation of my improved wrench. Fig. 2 is a side view of the same. Fig. 3 is a detail view of the ratchet-head with the nut-collar removed. Fig. 4 is an end view of the same. Fig. 5 is a section taken on the line 5 5, Fig. 3. Fig. 6 is a detail view of one of the operating-handles or lever-arms, shown partly in section to illustrate a spring-held dog or click. Fig. 7 is a detail view of a ratchet-head, showing means for regulating the size of the nut-socket. Fig. 8 is an end view of the same.

The same reference characters indicate the same parts in all the views.

Referring first more especially to Figs. 1 to 6, inclusive, let the numeral 5 designate what I will term the "head" of the wrench. This head consists of a cylindrical part having a central bolt-hole 6, a nut-socket 7 in each end, a central exterior ratchet zone 8, a fast collar 9 at one end of the ratchet, and a threaded portion 10 at the opposite end of the ratchet, adapted to receive a nut 12, which is screwed thereon when the parts are assembled and holds the parts in operative relation. Mounted on the ratchet zone 8 are two loose collars 13, each of which is provided with a lever arm or handle 14. Each collar is also provided with an opening, in which is located a click or dog 15, acted on by a leaf-spring 16, the latter being held in place by a suitable fastening device 17. Each dog 15 engages the teeth of the ratchet and acts to turn the ratchet-head in one direction as the lever-arms 14 are operated. When either lever-arm is turned in the backward or reverse direction, its click or dog slips over the teeth of the ratchet. When in use, the socket 7 in either end of the head is applied to the nut to be turned. The lever-arms 14 and their collars 13 are then moved in opposite directions, one arm or handle acting to turn the ratchet-head, while the click or dog of the other lever-arm slips over the teeth of the ratchet, moving in the opposite direction from the rotation of the head. In this way the handles are turned back and forth, being alternately active and idle, whereby an approximately continuous rotation of the head 5 is effected. If desired, one lever arm or handle may be kept still while the other is operated by a back-and-forth movement. In this case the still handle simply serves to prevent the head from moving in the wrong direction during the backward or reverse movement of the operating-handle.

In the construction shown in Figs. 7 and 8 each head of the wrench 5 is provided with two clamping-jaws 18, having dovetailed tongues engaging counterpart sockets formed in the head. These jaws are adjustable to fit nuts of various sizes by means of screws 19 having right and left threads engaging the jaws, the latter being provided with correspondingly-threaded openings, whereby the turning of either screw causes the jaws engaged thereby to approach or recede from each other, as may be desired, according as it becomes necessary to adjust the jaws to fit a smaller or larger nut.

It is preferred, as shown in the drawings, to place a separating-washer 20 between the operating-collars 13.

Having thus described my invention, what I claim is—

1. In a ratchet-wrench, the combination of a head having an exterior ratchet zone, and a nut-socket at the end, two collars surrounding the ratchet zone, each being provided with a spring-held dog or click and a lever arm or handle, and suitable means for holding the operating-collars in position on the head.

2. The combination of a head having a bolt-hole therein, a nut-socket at the end of the bolt-hole, a ratchet zone surrounding the head, a stop-collar at one end of said zone, a nut at the other end of the zone, and two loose collars interposed between the nut and stop-collar, each loose collar having a spring-held dog engaging the ratchet-teeth, and an operating lever-arm also connected with each loose collar.

3. In a ratchet-wrench, the combination of a head having an exterior ratchet zone, a longitudinal opening centrally located, and a nut-socket in each end, said sockets communicating with the central opening, two loose collars surrounding the ratchet zone, each being provided with a spring-held dog and a lever arm or handle, a washer separating the two collars, a stop-collar mounted on one end of the head, and a nut screwed on the other end of the head, the nut and the stop-collar holding the loose collars in operative relation with the head.

4. In a ratchet-wrench, the combination of a head having an exterior ratchet zone, said head being provided with two jaws at one extremity, the said jaws being adjustably mounted on the head whereby they may be regulated to fit nuts of different sizes, loose collars surrounding the ratchet zone, each being provided with a spring-held dog and a lever arm or handle, and suitable means for holding the operating-collars in position on the head.

5. In a ratchet-wrench, the combination of a head having an exterior ratchet zone, the said head having a central opening and a nut-socket composed of two movable jaws at each end of the head, an adjusting-screw provided with right and left threads engaging the two jaws at each end of the head, two loose collars surrounding the ratchet zone, each of said collars being provided with a spring-held dog and a lever arm or handle, and suitable means for holding the operating-collars in position on the head, substantially as described.

In testimony whereof I affix my signature in presence of two witnesses.

GUS FREELAND.

Witnesses:
   A. J. O'BRIEN,
   DENA NELSON.